…

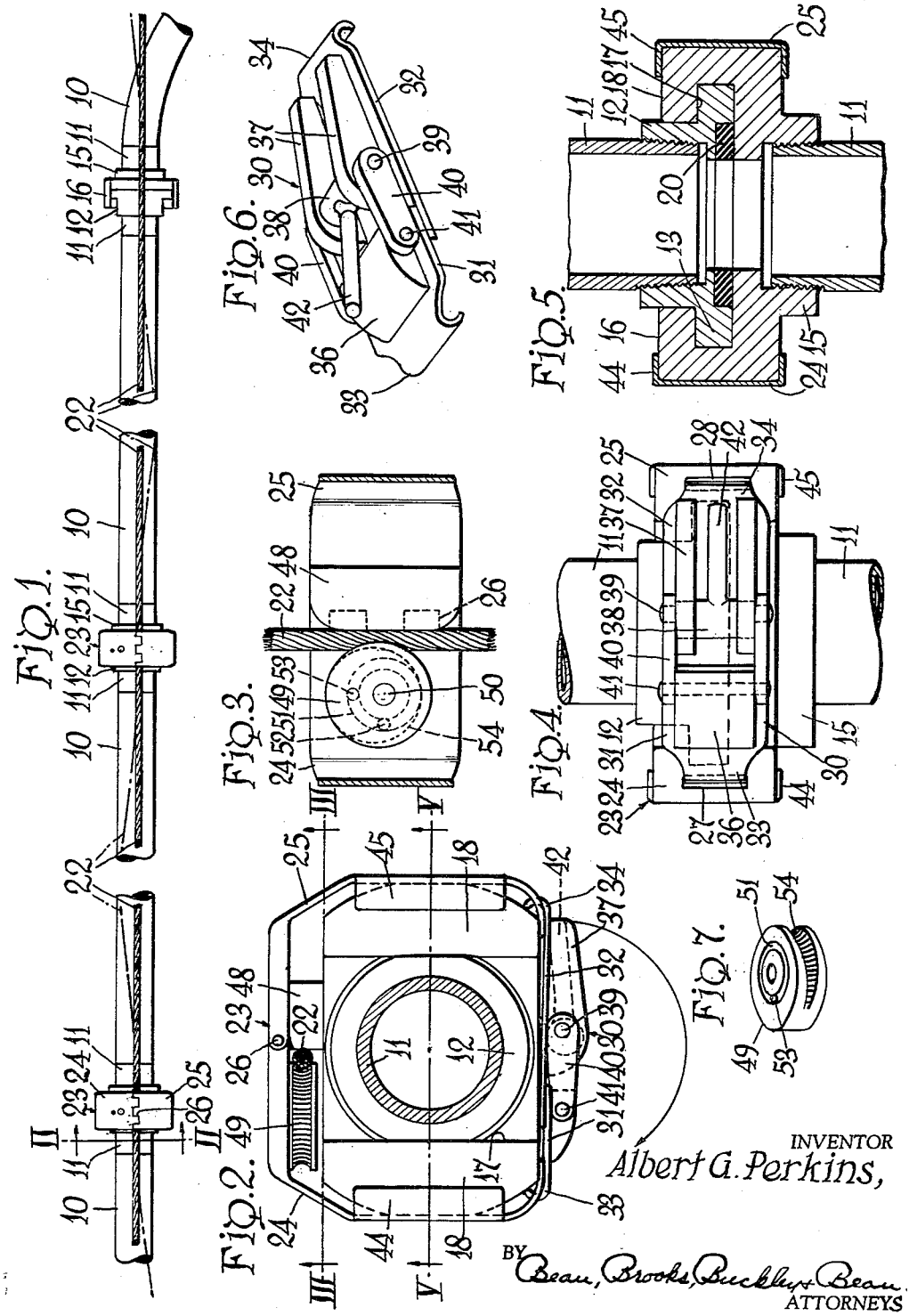

United States Patent Office 3,046,938
Patented July 31, 1962

3,046,938
HOSE AND CABLE COUPLING
Albert G. Perkins, Grand Island, N.Y., assignor to Perkins
Pipe Linings, Inc., Grand Island, N.Y.
Filed May 3, 1960, Ser. No. 26,546
8 Claims. (Cl. 118—506)

This invention relates to conduit couplings and attachments for associating cables with such couplings to attach the cables to conduits connected by the couplings.

A particular field of use of the improvements of the present invention is in connection with machines for applying plasic or semi-fluid lining material to the interiors of subterranean pipe. In a copending application of Warren E. Perkins and Alfred J. Perkins, Serial No. 811,583 filed May 7, 1959, now Patent No. 2,988,042, dated June 13, 1961, a pipe lining machine is drawn through an underground pipe by a cable and winch arrangement to apply a layer of cement mortar to the interior of the pipe. The mortar is continuously fed to the machine from above ground through a flexible conduit or hose as the machine is drawn through the pipe by the cable.

As discussed in Perkins Patent No. 2,786,486 dated March 26, 1957, it is desirable to shorten the mortar conduit as the distance from the lining machine to the mortar supply source is shortened since the pressure required to force the mortar through the conduit is directly proportioned to the length of the conduit. The patent just mentioned disclosed quick-detachable coupling for readily shortening the motar conduit by removing hose sections therefrom. The present invention may include couplings of the general type contemplated in Perkins Patent No. 2,786,486.

In the aforesaid pending Perkins application, Serial No. 811,583 the cable which draws the pipe lining machine through the underground pipe as the lining operation progresses is connected to the lining machine at one end and to a power operated winch at the other end. Beginning at the machine-connected end of the cable, the cable is attached to the hose couplings along the mortar conducting hose so that the pulling action of the cable withdraws the underground portion of the hose as the lining machine progresses toward the winch and the mortar supply source which are both generally located above ground at one end of the section of pipe which is being lined.

In attaching the pulling cable to the hose couplings provision must be made for ready detachment so that, as connected portions of the mortar hose and winch cable approach the mortar supply source and the winch, the two may be quickly and conveniently separated.

Wire rope cable of the type employed in the foregoing machine pulling function does not naturally lay straight and considerable tension must be applied to straighten the same. Accordingly, if the cable is attached to a succession of hose couplings in the manner previously contemplated and practiced, the cable will be slightly bowed and kinked along its length from the first cable connected hose coupling to the last.

Accordingly, most of the pulling force of the cable will be applied to the hose coupling which is nearest to the winch and mortar supply and the hose pulling force between such coupling and the machine will be borne by the hose itself. In fact in extreme cases the mortar hose may actually be serving as the machine pulling element throughout substantial portions of its length. In any event, undesirable stretching forces will be applied to the hose by the pull of the cable.

The present invention comprises a cable and hose attachment arrangement which provides for ready elimination of slackness in the cable between points of attachment to the hose couplings so that the cable pulls more or less uniformly against the several hose couplings and, more importantly, so that the ultimate pulling force of the cable on the machine is applied directly to the lining machine by the cable, rather than in whole or in part through the mortar hose. The foregoing, together with attaching means arranged for quick and convenient attachment and separation, comprise the principal objects of the present invention. Furthermore, the present invention provides retaining means which prevent accidental or inadvertent separation of the coupling members.

A single embodiment of the hose coupling and cable attaching apparatus of the present invention is illustrated in the accompanying drawing and described in detail in the following specification by way of example. However, it is to be understood that such embodiment is illustrative only and that various mechanical modifications may be introduced without departing from the principles of the invention and the scope thereof is not limited to the embodiment disclosed herein nor otherwise than as defined in the appended claims.

In the drawing:

FIG. 1 is a general fragmentary top plan view of a series of hose sections and an attached winch cable showing coupling and cable attaching means constructed in accordance with one form of the present invention;

FIG. 2 is a transverse cross sectional view on the line II—II of FIG. 1;

FIG. 3 is a detailed cross sectional view on the line III—III of FIG. 2;

FIG. 4 is a bottom plan view of one of the hose couplings of FIG. 1 on an enlarged scale;

FIG. 5 is a cross sectional view on the line V—V of FIG. 2;

FIG. 6 is a detailed perspective view of a locking member of one of the coupling clamp members; and FIG. 7 is a perspective view of a cable cam lock of one of the coupling clamp members.

Like characters of reference denote like parts throughout the several figures of the drawing and, referring to FIG. 1, the numeral 10 designates a series of hose or flexible tubular members of the type employed to conduct cement mortar from a source of supply, usually above ground, to a pipe lining machine located within a subterranean pipe. Each hose member 10 has a permanently attached ferrule or nipple 11 at each end for connection with coupling members or other fittings.

In the present instance the nipple 11 at one end of each hose member 10 is threaded into a coupling collar 12 having two outwardly projecting flanges 13 along opposite sides thereof. The nipple 11 at the other end of each hose is threaded into a coupling collar 15 having an enlargement 16 which has a T-slot formation 17 in its outer end face 18 into which the flanges 13 of collar 12 may be slid by relative movement of the coupling collars 12 and 15 in a direction at right angles to the axis of the hose members.

The outer end of coupling collar 12 which bears the flanges 13 is recessed to receive a resilient sealing or packing member 20 of rubber or the like. This forms a very effective fluid-tight joint since radially outward pressure against the confined resilient member 20 tends to expand the same in an axial direction. Coupling members of the foregoing description may be employed in conjunction with the apparatus of the above-mentioned Perkins Patent No. 2,786,486 for removing individual hose or tubing sections from a line while the line is in operation and under internal fluid pressure.

Reference will now be had to clamp means attachable about the enlargement 16 of each coupling collar 15 to retain an associated coupling collar 12 assembled therewith and to provide means for associating cable means therewith in a novel manner whereby, after assembly, the cable may be moved relative to the coupling in one direction only, in a manner and for purposes which will presently appear.

Referring to the present apparatus as the same is used in conjunction with the pipe lining machine referred to above and disclosed in the aforesaid pending Perkins patent application, in FIG. 1 the left-hand end of the series of hose or tubing sections 10 is the end which is connected to the pipe lining machine and the right-hand end is the end which connects with the mortar supply source.

The curve of the hose member 10 at the right-hand end of FIG. 1 indicates the divergence of the hose and the cable at this end of the line, the cable being designated 22 in the drawing. From the right-hand end of FIG. 1 the hose extends to the mortar supply source while the cable 22 extends to the power winch which pulls the apparatus through a pipe being lined. Consequently, at approximately the portion of the hose and cable shown at the right-hand side of FIG. 1 the clamp means just referred to is released to permit such divergence of the hose and cable.

Referring particularly to FIG. 2, the clamp member which is generally designated by the numeral 23 in FIG. 1 comprises a pair of generally U-shaped members 24 and 25 which are hinged as at 26 in FIG. 2 to form a generally C-shaped frame adapted to be disposed about the enlargement 16 of coupling collar 15.

The ends of the U-shaped members 24 and 25 which are remote from the hinge or pivot 26 are provided with generally rectangular notches 27 and 28, respectively, which are engaged by a locking assembly designated generally by the numeral 30 in FIGS. 2 and 4.

Referring particularly to FIG. 6, the locking assembly 30 comprises generally a pair of plate members 31 and 32 whose outer terminal edges are provided with hook formations designated 33 and 34, respectively, which hook formations are adapted to hook into the rectangular openings 27 and 28 of the U-shaped members 24 and 25 of the clamp member.

Plate member 31 is provided with a bearing formation 36 and plate member 32 has a pair of spaced bearing formations 37 fixed thereto. An operating shaft 38 is journaled in the bearing formations 37 and has eccentric end portions 39 projecting outwardly beyond the bearing formations 37. A pair of links 40 are each connected at one end of each to the eccentric end portions 39 of operating shaft 38 and are pivoted at their other ends to the bearing formation 36 of plate member 31 as at 41. An operating handle 42 is fixed to operating shaft 38.

In FIG. 6 the locking member is shown with the operating handle 42 thereof in the open or released position wherein the hook formations 33 and 34 are at their maximum spacing and may readily be inserted in the notches 27 and 28 of the U-shaped members 24 and 25 of the clamp member. Rotation of operating handle 42 and operating shaft 38 in a clockwise direction from the position illustrated in FIG. 6 to the position illustrated in FIGS. 2 and 4, wherein the handle member 42 lies generally between the bearing formations 37, draws the hook formations 33 and 34 toward each other by operation of the eccentric end portions 39 of operating shaft 38 to draw the free ends of the U-shaped members 24 and 25 securely toward each other.

As shown in FIGS. 2 and 4, the clamp member 23 is thus securely locked about the enlargement 16 and medial portions of the U-shaped members 24 and 25 are provided with flanges 44 and 45 which embrace the enlargement 16 as shown in FIGS. 2 and 5 particularly, to prevent displacement in an axial direction.

The means for associating the draw cable 22 with the clamp assembly in a novel manner will now be described. The U-shaped member 25 is provided at its interior surface and adjacent to the pivot 26 with a rigid generally rectangular block formation 48. A movable member for releasably locking cable 22 against block 48 comprises a sheave-like wheel 49 which is eccentrically pivoted to the interior of U-shaped member 24 by a pin or shaft 50 so as to be freely rotatable.

The side of sheave 49 which is toward the adjacent wall of U-shaped member 24 is provided with a circular groove 51 which is concentric with pivot shaft 50 and a pin 52 carried by U-shaped member 24 rides in groove 51. A pin 53 in sheave 49 projects into circular groove 51 and is adapted to abut pin 52 of U-shaped member 24 to limit rotative movement of sheave 49. A concaved groove formation 54 extends along a portion of the periphery of sheave 49 and may be knurled or roughened as shown to increase the frictional engagement thereof against cable 22.

As viewed in FIG. 3 the upper portion of the cable extends to the pipe lining machine and the lower portion extends to the winch. As there shown, it will be noted that the low point of the eccentrically mounted sheave 49 is at the lower side of the figure and the high point at the upper side. Accordingly, a pull upon the upper end of the cable 22 as viewed in FIG. 3 will rotate sheave 49 in a releasing direction and cable 22 may be freely pulled through the clamp assembly in such direction. On the other hand, a downward pull on the cable, as viewed in FIG. 3, will rotate the sheave 49 in a locking direction to bind the cable between sheave 49 and block 48 to lock the cable therebetween.

Since the cable extends through a series of attaching or locking devices as indicated in FIG. 1, a manual pull on the cable at the pipe lining machine end thereof, which would be off to the left of FIG. 1, will straighten the cable and make it relatively taut between the several clamping devices 23. Accordingly, a subsequent pull on the cable 22 from the winch which is off to the right of FIG. 1 will apply a pulling force to each individual clamping assembly 23, so that the pull of the cable on the hose assembly will be more or less uniformly distributed among the several clamp and hose coupling assemblies and the pull of the cable on the lining machine will be direct rather than in whole or in part through the hose assembly.

I claim:

1. A combination conduit and cable assembly comprising a conduit having a plurality of spaced coupling members disposed therealong, a cable extending generally parallel and adjacent to said conduit, means associated with each of said plurality of couplings for engaging said cable therewith, each said means including uni-directional cable gripping means whereby said cable may be pulled freely in one direction relative to said coupling members but is gripped against relative movement in the opposite direction relative to said couplings.

2. A combination conduit and cable assembly comprising a conduit having a plurality of spaced pairs of separable coupling members disposed therealong, a cable extending generally parallel and adjacent to said conduit, clamp means engageable about said coupling members for retaining the same against separation, means associated with each of said clamp means for engaging said cable therewith, each cable engaging means including uni-directional cable gripping means whereby said cable may be pulled freely in one direction relative to said coupling members but is gripped against relative movement in the opposite direction.

3. A combination conduit and cable assembly comprising a conduit having a plurality of spaced detachable coupling members disposed therealong, a cable extending generally parallel and adjacent to said conduit, clamp means engageable about each of said plurality of couplings for retaining the same against detachment, said clamp means being hinged for opening and closing movement for applying and removing the same with respect to said couplings, each clamp means including uni-directional cable gripping means whereby said cable may be pulled freely in one direction relative to said coupling members but is gripped against relative movement in the opposite direction relative to said couplings.

4. A combination conduit and cable assembly comprising a conduit having a plurality of spaced detachable coupling members disposed therealong, a cable extending generally parallel and adjacent to said conduit, clamp means engageable about each of said plurality of couplings for retaining the same against detachment, said clamp means being hinged for opening and closing movement for applying and removing the same with respect to said couplings, each clamp means including uni-directional cable gripping means whereby said cable may be pulled freely in one direction relative to said coupling members but is gripped against relative movement in the opposite direction relative to said couplings, said cable gripping means comprising cooperating parts at opposite sides of said clamp hinge whereby a cable is fully released therefrom upon opening movement of the clamp means and is engaged by said cable gripping means upon closing movement of said clamp means.

5. A combination conduit and cable assembly comprising a conduit having a plurality of spaced separable coupling members disposed therealong, a cable extending generally parallel and adjacent to said conduit, clamp means engageable about each of said coupling members and said cable for retaining the coupling members against separation, said clamp means including uni-directional cable gripping means whereby said cable may be pulled freely in one direction relative to said coupling members but is gripped against relative movement in the opposite direction.

6. A combination conduit and cable assembly comprising a conduit and a cable extending generally parallel and adjacent thereto, means disposed at a plurality of points along said conduit for engaging said cable therewith, each said means including uni-directional cable gripping means whereby said cable may be pulled freely in one direction relative to said conduit but is gripped against relative movement in the opposite direction relative to said conduit.

7. A combination conduit and cable assembly comprising a conduit having a plurality of spaced coupling members disposed therealong, a cable extending generally parallel and adjacent to said conduit, means engageable about each of said couplings for engaging said cable therewith, said means being hinged for opening and closing movement for applying and removing the same with respect to said couplings, each said means including uni-directional cable gripping elements whereby said cable may be pulled freely in one direction relative to said coupling members but is gripped against relative movement in the opposite direction relative to said couplings.

8. A combination conduit and cable assembly comprising a conduit having a plurality of spaced coupling members disposed therealong, a cable extending generally parallel and adjacent to said conduit, means engageable about each of said couplings for engaging said cable therewith, said means being hinged for opening and closing movement for applying and removing the same with respect to said couplings, each said means including uni-directional cable gripping elements whereby said cable may be pulled freely in one direction relative to said coupling members but is gripped against relative movement in the opposite direction relative to said couplings, said cable gripping elements comprising cooperating parts at opposite sides of said hinge whereby a cable is engaged thereby upon closing movement of said means and released upon opening movement thereof.

References Cited in the file of this patent
UNITED STATES PATENTS

| | | |
|---|---|---|
| 1,110,011 | Schneider | Sept. 8, 1914 |
| 2,108,319 | Perkins | Feb. 15, 1938 |
| 2,485,872 | Fisher | Oct. 25, 1949 |
| 2,786,486 | Perkins | Mar. 26, 1957 |
| 2,897,779 | Perkins | Aug. 4, 1959 |